United States Patent Office 3,410,318
Patented Nov. 12, 1968

3,410,318
MACHINE FOR FEEDING TRANSVERSE WIRES
INTO A WIRE MESH WELDING MACHINE
Josef Ritter, Graz-Kroisbach, and Hans Gött, Graz, Austria, assignors to EVG Entwicklungs- und Verwertungsgesellschaft m.b.H., Graz, Styria, Austria, a corporation of Austria
Filed Mar. 7, 1967, Ser. No. 621,230
Claims priority, application Austria, Mar. 9, 1966,
A 2,239/66
9 Claims. (Cl. 140—112)

ABSTRACT OF THE DISCLOSURE

A mechanism for feeding transverse wires into a wire mesh welding machine. Said mechanisms operative to convert oscillatory rotary movement of a driving gear into intermittent rotary movement of a wire feed wheel drive shaft.

In wire mesh welding machines the longitudinal wires are usually taken off reels and fed, parallel to each other and spaced apart by the amount of the grid width, to a row of welding electrodes disposed transversely to the direction of advance of the longitudinal wires. Near the electrodes the transverse wires, which may or may not yet be cut into lengths, are shot into the machine from the side. The transverse wires are then welded to the longitudinal wires at the junctions, by the welding electrodes, using either the single point or the double point welding method. The same machine can be used for welding wire mesh of different mesh lengths and different mesh widths, by suitably adjusting the positions and the number of welding electrodes. However in order to vary the width of a strip of wire mesh it is also necessary to adjust the machine which feeds the transverse wires into the welding machine to match the specified transverse wire length, and this adjustment must be effected as nearly continuously as possible, rather than stepwise.

In modern wire mesh welding machines the transverse wires are also taken from a reel, the wire being shot into the welding machine and then cut to length. In these circumstances the feeding machine must function in such a way that between the end of one feeding cycle and the beginning of the next feeding cycle there is a pause which is long enough for the fed wire to be cut to length and moved out of the way to make room for the feeding of the next transverse wire.

In known kinds of transverse wire feeding machines the wire shooting mechanism is governed by an adjustable crank, the sweep diameter of the crank arm being related to the length of wire fed in each cycle. The crank carries a crank pin on which is pivoted a rack rod, the teeth of which engage with a pinion which drives a main shaft of the machine, usually through straight or bevel gear-wheels and through automatic couplings. This mechanism converts a reciprocating movement of the rack rod into an intermittent unidirectional rotation of the main shaft. On the main shaft is mounted a wheel, which cooperates with a second wheel to grip the transverse wire between them and shoot the wire into the welding machine when the wheels are rotated.

As soon as the crank pin reaches one of its dead center positions the pinion stops rotating, and then begins rotating in the opposite direction. During this change of direction the coupling which was previously engaged to drive the main shaft becomes disengaged and the previously disengaged coupling is then engaged to continue driving the main shaft in the same direction. Now, if these couplings are claw couplings, there is a pause during this switch over and during which time the main shaft is stationary. The length of this pause depends not only on the rotational speed of the crank but also on the idle angle through which the crank rotates before the main shaft starts to rotate again. The length of the pause is therefore a function of the tooth spacing in the claw couplings, the gear ratio and the crank radius. Here a difficulty arises because, as already mentioned, it is desirable to be able to adjust the length of the cut transverse wire as continuously as possible, rather than stepwise, and for this reason the claw couplings must have as many teeth as possible. But, in the known machines a large number of teeth in the claw couplings has the result that the switching angle is too small and the switching pause is too short.

According to the invention, a machine for feeding transverse wires into a wire mesh welding machine comprises a main shaft carrying a wheel for advancing wire into the welding machine and a mechanism for rotating the main shaft intermittently and in one direction only so that the required length of wire is advanced in each cycle, the mechanism comprising two bevel wheels rotatably mounted on the main shaft, a driving unit which is arranged to rotate the bevel wheels in opposite directions to each other and which is also arranged to periodically reverse the direction of rotation of each bevel wheel, a sleeve which is mounted on the main shaft between the bevel wheels so that it is movable axially but not rotatably relative to the main shaft and which is arranged to be connected alternately to each of the two bevel wheels to rotate the main shaft, the switch from one to the other occurring in a pause during which the direction of rotation of each bevel wheel changes so that the main shaft is rotated intermittently and in one direction, the length of wire fed to the welding machine in each cycle being dependent on the speed of rotation of the bevel wheels with the period of each cycle remaining constant, and the connection between each bevel wheel and the sleeve being effected by a switching ring having on its face adjacent the sleeve a set of finely spaced teeth which engage with a similar set of teeth on the adjacent face of the sleeve when the sleeve is connected to the associated bevel wheel and which are disengaged when the sleeve is not connected to the bevel wheel, and having on its other face a coupling which permanently connects the switching ring to its associated bevel wheel but which allows a certain amount of rotational play between the two, this play being taken up when the sleeve is fully engaged with the switching ring and the main shaft is rotating and being at a maximum when the sleeve is disengaged from the switching ring and the main shaft is rotating, and the maximum amount of rotational play being considerably greater than the spacing between the teeth, the arrangement being such that when the bevel wheels start to rotate again after their directions of rotation have changed, the sleeve is forced out of engagement with one switching ring and into engagement with the other as the rotational play between this other switching ring and its bevel wheel is taken up by the movement of the bevel wheel.

What is obtained in this way is that in transmitting the rotation of the bevel wheel through the coupling, the switching ring and the fine teeth to the sleeve and so to the main shaft, it is possible to engage the switching ring with the sleeve accurately to within a small angle limited only by the spacing between the fine teeth, while at the same time leaving constant the amount of rotational play, i.e., the angle of free movement between the bevel wheel and the switching ring, so that switching pauses of sufficient duration to allow the transverse wire to be cut and the mesh moved onwards to make room for the next transverse wire are ensured.

The coupling between the bevel wheel and the switching ring may be arranged in various ways, but preferably each switching ring is connected to its bevel wheel by a claw coupling comprising a claw on the switching ring having a flank which is parallel to the axis of the main shaft and another flank, the surface of which forms a substantially helical surface, and a similarly shaped recess in the bevel wheel for receiving the claw. When the bevel wheel rotates relative to the switching ring through the angle of the rotational play, the helical surfaces of the two halves of the claw coupling slide along each other and the switching ring travels axially between the positions of minimum and of maximum play. Preferably the axial movement of the switching ring relative to the bevel wheel is limited by mechanical stops.

As an alternative each switching ring engages with its bevel wheel through a screw thread which is steep and is not self-locking. In this case also, a relative rotation between the switching ring and the bevel wheel through the angle of rotational play produces a corresponding axial relative movement between these two parts.

An example and modification of a machine in accordance with the present invention will now be described with reference to the accompanying drawings, in which.

Figure 1:
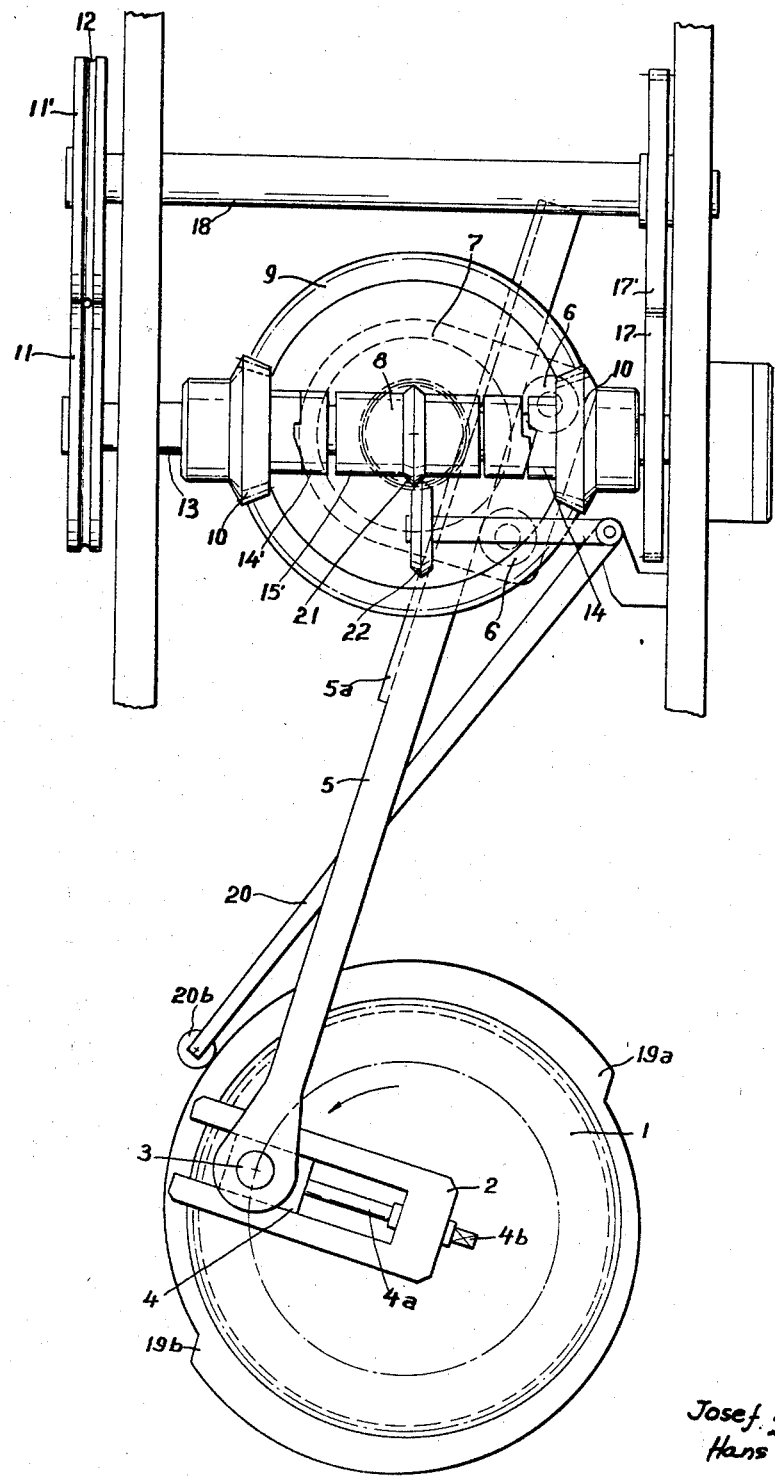
FIGURE 1 is a side view of the working parts of the machine.

The machine shown in FIGURE 1 has a driving wheel 1 which is driven at a speed which depends on the length of the advancing stroke of the longitudinal wires which are advanced through a mesh welding machine for welding. The driving wheel 1 carries a radial guide 2 in which there slides a slide 4 supporting a crank pin 3. The slide 4 is adjustable in position along the guide 2 by means of a screw-threaded spindle 4a which has a square head 4b. A connecting rod 5 is connected at one end to the crank pin 3 and has its free end 5a arranged to be a toothed rack.

Figure 2:
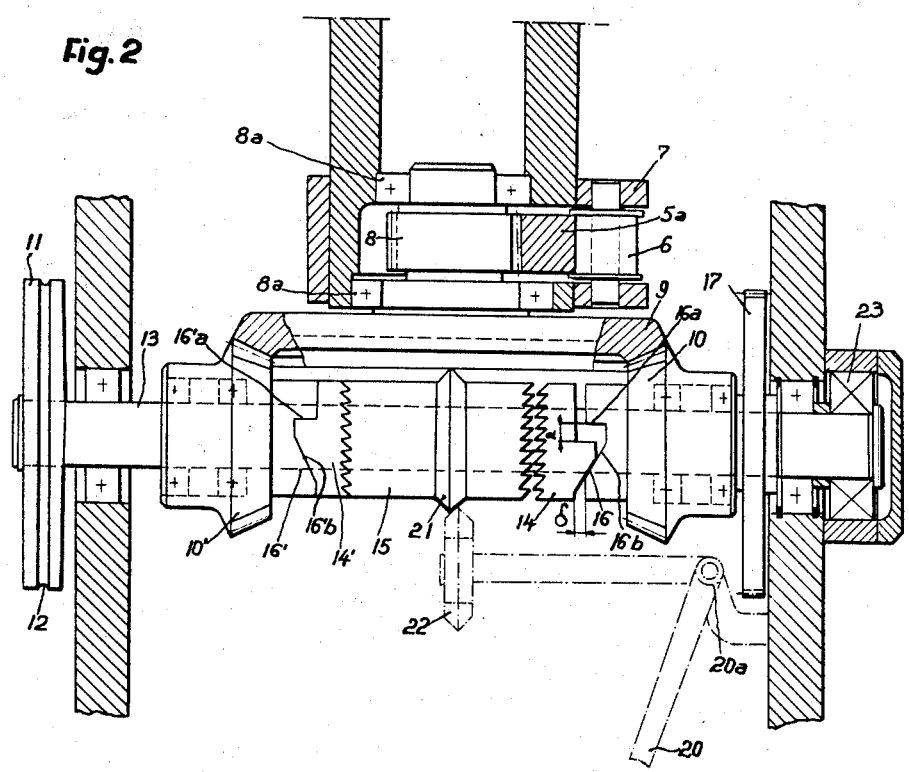
FIGURE 2 is a partly sectioned plan of the view shown in FIGURE 1.

The rack 5a engages a pinion 8, as shown in FIGURES 1 and 2, and is held in constant engagement with this pinion by rollers 6 which support the back of the connecting rod 5. These rollers are mounted in bearings in a cage 7 pivoted about the axle of the pinion 8. FIGURE 2 shows how the pinion 8 is mounted in a bearing 8a in the frame of the machine, only parts of the frame being shown in the drawing. The pinion 8 is connected coaxially with a large bevel wheel 9. By means of the parts 1 to 7, the constantly rotating driving wheel 1 alternately rotates the pinion 8, and with it the large bevel wheel 9, first in one direction and then in the other.

The large bevel wheel 9 engages two diametrically opposite smaller bevel wheels 10 and 10', each of which is mounted on a shaft 13, this being the main shaft of the machine, so that each is rotatable on the shaft 13 but fixed axially relative to the shaft 13. Each small bevel wheel 10, 10' engages a switching ring 14, 14' through a claw coupling 16, 16' which has a flank 16a, 16a' extending approximately axially, and a second flank 16b, 16b' having a helical surface. The switching rings 14, 14' form the other halves of the claw couplings.

Both the claw couplings are permanently engaged, although the depth of engagement is variable between a minimum value and a maximum value. When the depth of engagement of a claw coupling changes from the minimal value to the maximal value, the switching ring 14, 14' slides axially along the main shaft 13 through a distance $s$, and at the same time rotates through an angle of $\alpha_v$ relative to the claw of the small bevel wheel 10, 10'. The other face of each switching ring 14, 14' has fine teeth which are arranged to engage with teeth on an adjacent face of a coupling sleeve 15, which is mounted to slide axially on the main shaft 13 between the switching rings but cannot rotate relatively to the shaft 13. The sleeve 15 is arranged to engage through its teeth, alternately one, and then the other of the switching rings 14, 14'. The spacing between the teeth is considerably smaller than the angular switching play $\alpha_v$ of the claw couplings.

Midway between the ends of the coupling sleeve 15 and extending round its periphery, is fixed an annular control blade 21. A roller blade 22 is mounted on one arm of an angled lever 20 which pivots about a pivot pin 20a attached to the frame of the machine, so that the roller 22 can be pivoted into and out of engagement with the control blade 21. The other arm of the angled lever 20 extends to the driving wheel 1, and a cam follower roller 20b mounted on the end of this arm of the lever 20 follows the curves of two cams 19a and 19b situated on the periphery of the driving wheel 1.

In FIGURE 2 the coupling sleeve 15 is shown fully engaged with the switching ring 14' and bevel wheel 10' on the left, being locked in this position by the roller 22 in engagement with the control blade 21. The roller 22 is held in this position by the angled lever 20 and its relationship with the cam 19a on the driving wheel 1. In this case the teeth of the coupling sleeve 15 are fully engaged with those of the switching ring 14' and the claw 16' of the small bevel wheel 10' is fully engaged with the claw of the switching ring 14'.

On the right-hand side of FIGURE 2 the coupling sleeve is disengaged from the switching ring 14, and this ring 14 is angularly displaced through the angle $\alpha_v$ relative to the small bevel wheel 10 and is axially displaced along the main shaft 13 from the wheel 10 by the distance $s$, this being the switching gap. The switching ring 14 is held in this position by a spring (not shown) which pushes it up against a mechanical stop (also not shown). This spring is equivalent to a spring shown at 24' in FIGURE 3. However, even though the claw coupling is disengaged in this sense, the claws remain sufficiently in engagement to ensure that the switching rings 14, 14' are compelled to follow the idle movements of the bevel wheels 10, 10'. The arrangement ensures that when the direction of rotation of the bevel wheels changes during the switching over process, the full switching gap $s$ and the angle $\alpha_v$ are available for the switching operation.

The teeth on the switching rings 14, 14' and on the coupling sleeve 15 are as fine as technically possible to allow the adjustment for different transverse wire lengths to be as nearly continuous as possible, or to take place in steps as small as possible.

With reference to FIGURE 1, a pinion 17 is mounted on the main shaft 13 and engages a pinion 17' mounted on a shaft 18, these two pinions being fixed to their shafts. The shaft 13 drives a wheel 11 and the shaft 18 drives a second wheel 11', these two wheels 11 and 11' being arranged edge to edge and both having grooves 12 so that the transverse wire may be received between them. The wire is gripped frictionally between the wheels, and when the wheels are rotated the wire is forced through the gap between the wheels and shot into the wire mesh welding machine.

Figure 3:
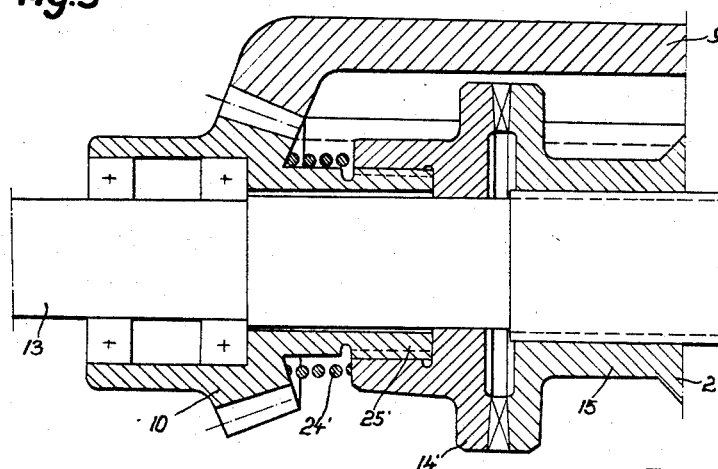
FIGURE 3 is a section through a modification of part of the machine shown in FIGURE 2.

Instead of the claw coupling arrangement between the bevel wheels 10, 10' and the switching rings 14, 14' which is described above, there may, of course, be other kinds of coupling which also give the necessary amount of play, and an example of such a further coupling is shown in FIGURE 3.

In this example the relative movement between the bevel wheel 10' and the switching ring 14' is produced by a thread 25', which is steep and not self-locking. When the coupling is fully engaged a spring 24' is compressed. When the coupling is partly disengaged the spring 24' extends and holds the switching ring 14' in its uncoupled position of rest firmly enough to ensure that when the coupling is engaged again the full amount of the switching play is available.

The drive for the wire shooting machine as described above, is effected by a driving wheel 1, a crank pin 3 and connecting rod 5, and provides an acceleration during the first quarter turn (0–90°), starting from a dead centre position of the crank pin 3, whereas the second quarter turn (90–180°) causes a deceleration of all the parts of the driving mechanism except the driving wheel 1. The locking mechanism which comprises the locking cams 19a and 19b the control blade 21, the roller 22 and the lever 20, prevents the coupling from disengaging under the influence of inertial forces.

The main shaft 13 is prevented from rotating backwards during the switching over process, due to the change in direction of the motion of the rack rod, by means of a nonreturn lock 23, shown only diagrammatically in FIGURE 2.

We claim:

1. In a machine for feeding transverse wires into a wire mesh welding machine of the kind comprising a main shaft, a wheel for advancing wire into said welding machine, means drivingly connecting said wheel to said main shaft, and driving means for intermittently rotating said main shaft in one direction only, said driving means ensuring that the required length of wire is advanced in each cycle and comprising first and second bevel wheels rotatably mounted on said main shaft, means for rotating said first and second bevel wheels in opposite directions to each other and for periodically and simultaneously reversing the directions of rotation of said bevel wheels, a sleeve, means axially slidably mounting said sleeve on said main shaft between said first and second bevel wheels whereby said sleeve is slidable between a first position and a second position, means fixing said sleeve angularly relative to said main shaft, connecting means for connecting said sleeve to said first bevel wheel when said sleeve is in said first position and to said second bevel wheel when said sleeve is in said second position, and means for switching said sleeve from said first to said second position while said main shaft is stationary between two successive rotations of said intermittent rotations and from said second to said first position while said main shaft is next stationary, the improvement wherein said connecting means includes first and second switching rings mounted on said main shaft, said first switching ring being located between said first bevel wheel and said sleeve and said second switching ring being located between said second bevel wheel and said sleeve, a set of finely spaced teeth on a face of each of said first and second switching rings adjacent said sleeve, a set of finely spaced teeth on the face of said sleeve adjacent said first switching ring and a set of finely spaced teeth on the face of said sleeve adjacent said second switching ring, said set of teeth on said first switching ring being engaged with said adjacent set of teeth on said sleeve when said sleeve is in said first position and said set of teeth on said second switching ring being engaged with said adjacent set of teeth on said sleeve when said sleeve is in said second position, first and second coupling means, said first coupling means being located on the face of said first switching ring remote from said face with said set of teeth and permanently connecting said first switching ring to said first bevel wheel said second coupling means being located on the face of said second switching ring remote from said face with said set of teeth and permanently connecting said second switching ring to said second bevel wheel, said first and second means allowing similar amounts of rotational play between said first switching ring and said first bevel wheel and between said second switching ring and said second bevel wheel respectively, said rotational play between said first switching ring and said first bevel wheel being taken up when said sleeve is in said first position and said main shaft is rotating and being at a maximum when said sleeve is in said second position and said main shaft is rotating and said rotational play between said second switching ring and said second bevel wheel being taken up when said sleeve is in said second position and said main shaft is rotating and at a maximum when said sleeve is in said first position and said main shaft is rotating, said maximum amount of rotational play being considerably greater than the spacing between adjacent teeth in said sets of teeth.

2. A machine according to claim 1, wherein each of said first and second coupling means comprises a claw on said switching ring, a first flank portion on said claw substantially parallel to the longitudinal axis of said switching ring, a second flank portion on said claw defining a substantially helical surface, and means defining a recess in said bevel wheel for matingly receiving said claw.

3. A machine according to claim 1, wherein each of said first and second coupling means includes an annular nose on said bevel wheel, an external screw thread on said nose, said screw thread being steep, wall parts on said switching ring defining an annular recess for receiving said nose, and an internal screw thread in said recess for cooperating with said thread on said nose.

4. A machine according to claim 2, wherein said first and second coupling means each further include mechanical stops for limiting axial movement between said switching ring and said bevel wheel.

5. A machine according to claim 4, wherein said first and second coupling means each further include a spring, means holding said spring between said switching ring and said bevel wheel, said spring biasing said switching ring and said bevel wheel apart.

6. A machine according to claim 1, wherein said means for rotating said first and second bevel wheels includes a driving wheel, a radially adjustable crank arm, means fixing said crank arm on said driving wheel, a connecting rod, means pivotally connecting said connecting rod to said crank arm, a rack on said connecting rod, a pinion which meshes with said rack, a main bevel wheel, and means connecting said pinion to said main bevel wheel to turn said main bevel wheel with said pinion, said main bevel wheel meshing with and driving said first and second bevel wheels on said main shaft.

7. A machine according to claim 6 further including a locking member, an annular collar, means fixing said annular collar around said sleeve, and operating means for automatically engaging said locking member with said collar after said sleeve is switched to either one of said first and said second positions to hold said sleeve in engagement with either one of said first and said second bevel wheels, said operating means automatically disengaging said locking member from said collar just before the next of said switching operations.

8. A machine according to claim 7, wherein said operating means comprises a lever, means connecting said lever at one end to said locking member, a cam follower, means attaching said cam follower to the other end of said lever, and a cam surface for engaging said cam follower, said cam surface being formed round the periphery of said driving wheel.

9. A machine according to claim 1, the machine also including a nonreturn lock, means mounting said nonreturn lock on said main shaft, said nonreturn lock ensuring that said main shaft rotates in said only one direction.

References Cited

UNITED STATES PATENTS

| | | | |
|---|---|---|---|
| 1,866,382 | 7/1932 | White | 140—112 |
| 2,736,347 | 2/1956 | Kaunitz | 140—112 |

CHARLES W. LANHAM, *Primary Examiner.*

L. A. LARSON, *Assistant Examiner.*